United States Patent [19]
Dickinson

[11] 4,090,554
[45] May 23, 1978

[54] HEAT EXCHANGER
[75] Inventor: Robert Dickinson, Lynchburg, Va.
[73] Assignee: The Babcock & Wilcox Company, New York, N.Y.
[21] Appl. No.: 742,723
[22] Filed: Nov. 17, 1976
[51] Int. Cl.² .................................. F28F 11/00
[52] U.S. Cl. ................... 165/1; 23/230 L; 165/11; 165/70
[58] Field of Search .............. 165/1, 11, 70; 23/230 L

[56] References Cited
U.S. PATENT DOCUMENTS

| | | | |
|---|---|---|---|
| 2,853,277 | 9/1958 | Boni, Jr. et al. | 165/70 X |
| 3,969,077 | 7/1976 | Hill | 23/230 L |

FOREIGN PATENT DOCUMENTS

| | | | |
|---|---|---|---|
| 730,284 | 5/1955 | United Kingdom | 165/70 |
| 960,628 | 6/1964 | United Kingdom | 165/70 |
| 804,592 | 11/1958 | United Kingdom | 165/70 |

*Primary Examiner*—Albert W. Davis, Jr.
*Attorney, Agent, or Firm*—Joseph M. Maguire; Angelo Notaro

[57] ABSTRACT

A heat exchanger in which mutually reactive heat transfer fluids are utilized. Tubes are interposed coaxially with other tubes so as to form a limited volume, wherein these fluids can mix and react in a controlled manner, permitting detection of leakage across the boundaries separating the reactive fluids before a major chemical or physical reaction can occur.

3 Claims, 3 Drawing Figures

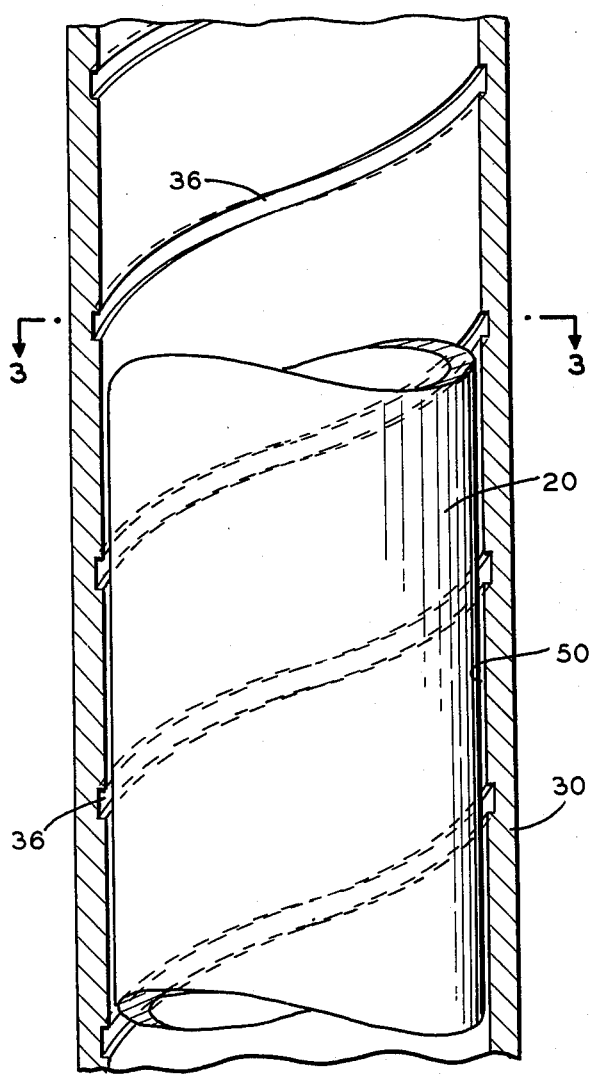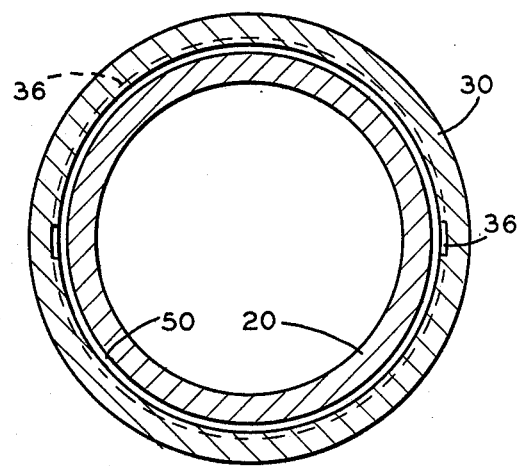

HEAT EXCHANGER

BACKGROUND OF THE INVENTION

1. Field of Invention

This invention relates to heat exchangers, and more particularly to heat exchangers in which heat is indirectly transferred between chemically reactive or otherwise incompatible substances.

2. Description of the Prior Art

Shell and tube type heat exchangers are often used to transfer heat between fluids which are known to be chemically or physically reactive with each other. Direct contact between these reactive fluids due to leakage within the heat exchanger causes highly undesirable effects including the formation of corrosive products which may destroy the materials of the heat exchanger, exothermic chemical reactions resulting in locally elevated temperatures at the location of the leak which may reduce the material strength at this location leading to progressive enlargement of the leak, and the production of gaseous and/or corrosive reaction products which cause undesirable pressure fluctuations or explosions or corrosion of nearby surfaces substantially damaging or destroying the heat exchange apparatus.

It is known that the aforementioned effects may be minimized by utilizing a coaxial tube arrangement, in which the intermediate volume formed between the coaxial tubes provides an annular space for a heat conductive substance not reactive with either of the reactive fluids. The intermediate substance may serve as either a diluent for fluids which leak into the intermediate volume or as an indicator of leakage. Depending upon the fluids employed, the presence of leakage may be indicated by various physical or chemical manifestations, for example, changes in pressure, temperature, viscosity, color, odor or electrical conductivity.

Illustratively, in some nuclear power plant designs, a liquid metal such as liquid sodium is used to cool the reactor and transfer heat to water for the generation of steam or to superheat steam. Liquid sodium, which reacts violently when it comes into contact with water or steam producing highly metal-corrosive substances and hydrogen gas, is separated from the water or steam in the steam generating or superheating heat exchangers by a tube bundle of radially spaced coaxial tubes. Typically, in the prior art, liquid sodium flows through the inner tubes and a flow of water or steam is maintained over the outside surface of the tube bundle. The annular space between the inner tubes and the coaxial outer tubes is filled with another intermediate heat conductive liquid which does not react with either sodium or water in an undesirable fashion, e.g., mercury. The intermediate fluid is provided by a system which includes means of fluid communication with the annular spaces and suitable sight glasses, level indicating devices or pressure indicators. The pressure of the liquid sodium may be greater or less than that of the intermediate fluid. Any leak in an inner or outer tube results in a change in the level or pressure of the intermediate fluid, thereby giving an indication of such leakage. Upon such an indication, the heat exchange apparatus may be shut down, drained and repaired without having experienced the undesirable consequences of contact between the reactive substances. It is apparent to those skilled in the art that this configuration, while effective, is difficult to analyze for stresses, expensive to construct, and often less efficient in heat transfer due to the presence of an intermediate heat transfer substance which may have lower thermal conductivity than the substance in which it is contained and through which the heat must pass.

SUMMARY OF THE INVENTION

In accordance with the principles of the invention, the disadvantages of the prior art, discussed above, are effectively surmounted by practice of the invention. Consequently, a heat exchanger, made in accordance with this invention, does not require the so-called "third intermediate substance", heretofore required, but utilizes the reaction of the reactive substances, in limited and controlled volumes, to detect leakage of the incompatible fluids before quantities sufficient to damage the heat exchanger can intermix.

BRIEF DESCRIPTION OF THE DRAWINGS

FIG. 2 is a sectional side view of a part of a coaxial tube combination of FIG. 1;

FIG. 3 is a cross-sectional view taken along line 3—3 of FIG. 2.

DESCRIPTION OF THE PREFERRED EMBODIMENT

Figure 1:
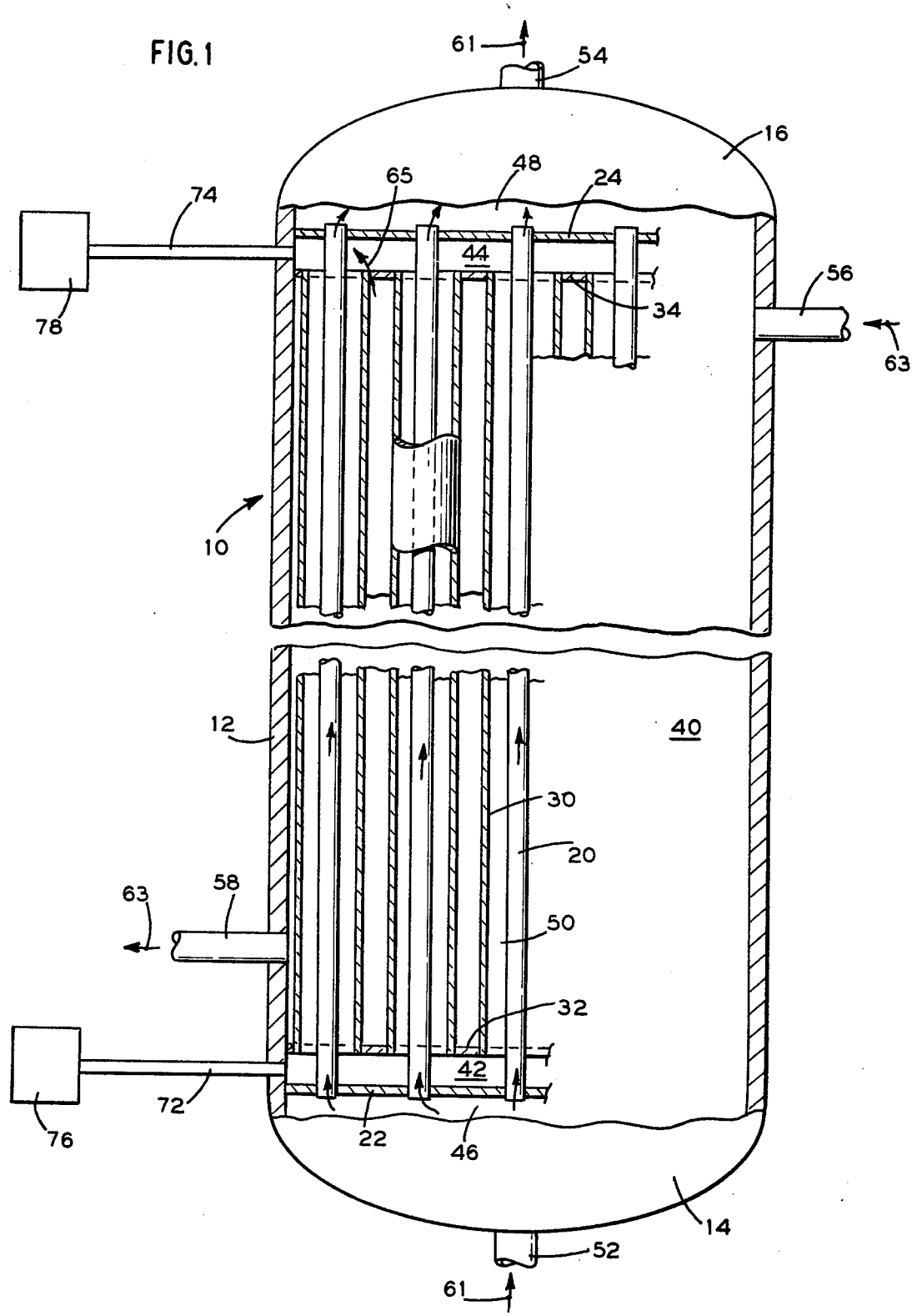
FIG. 1 is an elevation view, partly in section, of a typical heat exchanger according to the invention.

FIG. 1 shows a heat exchanger 10 comprising a cylindrically shaped shell 12, oriented with its longitudinal axis in a vertical plane, closed at its lower and upper ends by a lower hemispherical head 14 and an upper hemispherical head 16, respectively. In the lower head 14, a nozzle 52 provides an inlet for a tubeside fluid 61 that enables the fluid to flow into a lower chamber 46 formed by the internal surface of the lower head 14 and by a first outer tubesheet 22 disposed perpendicularly to the longitudinal axis of the shell. Located at the lower end of the heat exchanger in the illustrated embodiment is a first inner tubesheet 32 spaced toward the center of the shell parallel to and in close proximity with the first outer tubesheet 22 forming a lower inner chamber 42 between the first inner and outer tubesheets. A second inner tubesheet 34, transversely oriented with respect to the longitudinal axis, is spaced on the opposite side of the longitudinal center of the shell from the tubesheet 22 and 32; a second outer tubesheet 24 is located further beyond the longitudinal center, parallel to and in close proximity with the second inner tubesheet 34 so as to form a second inner chamber 44 within the upper portion of the illustrated heat exchanger. The tubesheets 22, 24, 32, 34 are integrally attached to the shell by welding or other means to provide a leakproof relation. A plurality of openings in the lower outer tubesheet 22 receives the first ends of a bundle of tubes 20. The tube 20 extends, in parallel orientation with the longitudinal axis of the heat exchanger, coaxially nested within one of larger diameter tubes 30. The first end of each tube 30 is received in a hole in the first inner tubesheet 32. In between the inner tubesheets 32, 34, each outer tube 30 coaxially circumscribes an inner tube 20 forming a concentric volumetric gap 50 in the space intermediate with each coaxially arranged inner and outer tube combination. The opposite end of each outer tube 30 is received in an opening in the upper inner tubesheet 34. The inner tubes 20 extend beyond the upper inner tubesheet 34 and are received in tube receiving holes of the upper outer tubesheet 24. The tubeside fluid 61 flows from the lower chamber 46, through the inner tubes 20, into an upper outer chamber 48 formed by the upper outer tubesheet 24 and the upper hemispherical head 16. In the upper head, a nozzle 54 enables the tubeside fluid 61 to flow out of the upper chamber 48.

A nozzle 56 on shell 12 provides an inlet for a shellside fluid 63 to a shellside chamber 40 formed by the shell and the outside surface of the outer tubes 30 in the space between the inner tubesheets 32 and 34. A second nozzle 58 on the shell 12 provides an outlet for the shellside fluid 63 from the shellside chamber 40.

As shown in FIGS. 2 and 3 the inner surface of outer tube 30 has formed therein one or more spiral grooves 36. Each spiral groove is continuous over the length of the tube in between the inner tubesheets 32, 34. The continuous groove 36 need not be spiraled and in differing embodiments could be formed on the outside surface of the inner tube alone or on both the inner surface of the outer tube and the outer surface of the inner tube. Typically, the volume of the spiral grooves 36 is significantly greater than the volumes of gaps 50. The gaps generally assure fluid communication between leaking inner tubes, the spiral groove and the inner chambers. Since some inner and outer tube contact may be experienced due, for example, to the minimal radial gap clearance or to tube vibration, spiral groove 36 assures fluid communication of the leakage with the inner chambers 42, 44. Nozzles 72, 74 on shell 12 (FIG. 1) provides a means of connecting appropriate devices 76, 78, e.g. pressure transducers, to detect reactive conditions in the inner chambers.

As shown in FIG. 1, the ends of inner tubes 20 are hermetically sealed at the outer tubesheets 22, 24 by welding, rolling, a combination thereof, or by other widely known sealing means. In the preferred embodiment, the outer tubes are not hermetically sealed to the inner tubesheets 32, 34. This permits limited amounts of shellside fluid as shown by the shellside fluid flow lines 65 to enter and fill inner chambers 42 and 44, gaps 50, and spiral grooves 36 thereby establishing continuous fluid communication between the two inner chambers. Alternate means, such as drilling a small hole or holes through the inner tubesheets 32, 34, or notching the tube receiving holes therein, may be used to permit controlled and limited shellside fluid 63 communication from chamber 40 to the inner chambers 42, 44 and, subsequently, to the spiral grooves 36 and the gaps 50.

The volumes of the inner chambers 42, 44 are carefully controlled by the spacing of the tubesheets to minimize the amounts of shellside fluid 63 contained therein relative to that of the main body of shellside fluid within chamber 40 resulting in a higher ratio of tubeside to shellside fluid than would result for a given leak rate of tubeside fluid directly into the shellside volume 40. The inner chamber volumes and the volume of the grooves and gaps must be limited to values which permit detection of leakage and remedial action prior to the occurrence of heat exchanger damage. Pertinent parameters for determining the volumes of the inner chambers, the gaps and the grooves include the pressure and temperature of the fluids 61, 63, their chemical reaction rates, the nature of the reaction products formed, the thermodynamic nature of the reaction, and the structure of the tubes, i.e., materials of construction and tube dimensions. It appears that grooves having either a depth or width of less than sixty mils would not be suitable for the purposes of this invention. In general, the total limited volume of the inner chambers, the spiral grooves and the gaps should not be greater than ten percent of the shellside volume 40 in order to assure ratios of tubeside to shellside fluid resulting in reactions which are readily detectable. The resulting reactions due to the leakage can be calculated by assuming, for example, varying leakage rates into the fixed limited volume described above. Alternately, a required limited volume can be determined based on the pressures attained by varying the limited volume for a maximum permitted or anticipated leak rate.

In a preferred embodiment of the invention, the higher pressure fluid is tubeside fluid 61. Typically, a heat exchange apparatus which can utilize the invention is a liquid metal steam generator wherein a liquid metal, e.g. sodium, is the shellside fluid and water or steam at a higher pressure is the tubeside fluid. Leakage across inner tube 20, or the outer tubesheets 22, 24, results in the mixing and reaction of the higher pressure tubeside fluid 61 with the shellside fluid 63 within the limited volume defined by chambers 42, 44, spiral grooves 36 and gaps 50, and in the formation of sodium hydroxide and gaseous hydrogen. Within the limited volume, the high concentration ratio of tubeside to shellside fluid relative to shellside volume 40 results in a higher and more easily detectable pressure excursion therein. The leakage and reaction of water or steam with the limited volume of liquid sodium can be detected by monitoring pressure or hydrogen concentration changes within the inner chambers 42, 44.

Depending upon the reaction characteristic of the mixing of the fluids, appropriate means are utilized to detect the limited reaction so that steps may be taken to safeguard against leakage and the damage which would occur upon mixing of the tubeside fluid with the main body of the shellside fluid. Illustratively, characteristic changes which can be measured include, but are not limited to, changes in pressure, in temperature, in viscosity or in electrical conductivity.

Except where qualified, the term "leakage", in the specification and claims, is intended to denote mixing or combining of the reactive fluids.

I claim:

1. A method of indirectly transferring heat in a shell and tube heat exchanger between shellside and tubeside fluids which are reactive in combination with each other and of detecting mixing of said fluids which comprises introducing the shellside fluid into a limited volume interposed between the main body of said shellside fluid from a higher pressure tubeside fluid, whereby heat is transferred between said main body of shellside fluid and the tubeside fluid is through said shellside fluid within said limited volume, and measuring a predetermined characteristic of the reaction occurring within said limited volume that characterizes mixing of said higher pressure tubeside fluid with said shellside fluid due to leakage.

2. A shell and tube heat exchanger for the indirect transfer of heat between reactive fluids, comprising means defining a tubeside volume adapted to contain a tubeside fluid, means defining a shellside volume adapted to contain a shellside fluid, said shellside and tubeside volumes being separated by a space of limited volume relative to said shellside volume, means for providing communication of said shellside fluid into said limited volume, and means for detection of a reaction due to leakage from said tubeside volume into said limited volume.

3. A heat exchanger for the indirect transfer of heat between reactive fluids comprising, in combination, a shell having a longitudinal axis, a set of inner tubesheets disposed transversely relative to said longitudinal axis, a set of outer tubesheets disposed transversely to said longitudinal axis, all of said tubesheets having a plurality of tube receiving openings, a plurality of coaxial tubes disposed between said inner tubesheets, whereby the inner and outer tubes of each of said coaxial tubes is separated by a gap, a plurality of grooves on the surface in communication with said gap between said inner and outer tubes, said outer tubes being attached to the tube receiving openings in said inner tubesheets, said inner tubes being attached in a fluid tight manner to the tube receiving openings in said outer tubesheets, a chamber formed in between adjacent inner and outer tubesheets, said chambers and said grooves and said gaps disposed in fluid communication with each other forming a limited volume relative to the remaining volume containing said shellside fluid, means for providing communication of said shellside fluid into said limited volume, and means for detection of a reaction due to reactive fluid leakage into said limited volume.

* * * * *